United States Patent [19]
Johns et al.

[11] Patent Number: 6,020,471
[45] Date of Patent: *Feb. 1, 2000

[54] PROCESS FOR ISOLATING PHYTOESTROGENS FROM PLANT PROTEIN

[75] Inventors: Paul W. Johns, Columbus; John D. Suh, Gahanna; Andre Daab-Krzykowski, Columbus; Terrence B. Mazer, Reynoldsburg; Fu-I Mei, Columbus, all of Ohio

[73] Assignee: Abbott Laboratories, Abbott Park, Ill.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/710,236

[22] Filed: Sep. 13, 1996

[51] Int. Cl.$^7$ .................... C07H 17/07; C07D 311/36; C07D 311/40
[52] U.S. Cl. ................................ 536/8; 549/403
[58] Field of Search ................................ 549/403; 536/8

[56] References Cited

U.S. PATENT DOCUMENTS

| | | | |
|---|---|---|---|
| 5,021,245 | 6/1991 | Borschel et al. | 426/2 |
| 5,248,804 | 9/1993 | Nardelli et al. | 558/147 |
| 5,352,384 | 10/1994 | Shen | 252/398 |
| 5,492,899 | 2/1996 | Masor et al. | 514/47 |
| 5,670,632 | 9/1997 | Chaihorsky et al. | 536/8 |
| 5,804,234 | 9/1998 | Suh et al. | 426/69 |

FOREIGN PATENT DOCUMENTS 0 575 121A  12/1993  European Pat. Off. .

OTHER PUBLICATIONS

Abstract of Japanese Patent Application No. 06 276955 A, Apr. 1994.
Database FSTA, 80–1–06–GO409, 1980, XP002051365, Staron T. and Guillman R.: A method for extracting rapeseed protein and oil by water.
Barnes, S., et al., "Isoflavones and their conjugates in soy foods: Extraction conditions and analysis by HPLC–Mass spectrometry," Journal of Agricultural and Food Chemistry, vol. 42, 1994, pp. 2466–2474.
Huang A–S., et al., "Characterization of the nonvolatile minor constituents responsible for the objectionable taste of defatted soybean flour," Journal of Food Science, vol. 47, 1981, pp. 19–23.
Reproductive and General Metabolic Effects of Phytoestrogens in Mammals, Kaldas and Hughes, *Reproductive Toxicology*, vol. 3, pp. 81–89, 1989.
High–Performance Liquid Chromatographic Analysis of Phytoestrogens in Soy Protein Preparations with Ultraviolet, Electrochemical and Thermospray Mass Spectrometric Detection(erroneously referred to in the specification as Naturally Occurring Non–Steroidial Estrogens of Dietary Origin), Setchell and Welsh,*J. Chrom.*, 386, 315–323, 1987.
Estrogens in the Environment II, McLachlan, New York Elsevier Press, pp. 69–85, 1985.
Nonsteroidal Estrogens of Dietary Origin: Possible Roles in Hormone–Dependent Disease, Setchell, et al., *Am J. Clin. Nutr.*, 40:569–578, 1984.
Determination of Urinary Lignans and Phytoestrogen Metabolites, Potential Antiestrogens and Anticorcinogens,, in Urine of Women on Various Habitual Diets, Adlercreutrz, et al., *J. Steroid Biochem*, 25:791–797, 1986.
Removal of Phenolic Compounds from Soy Protein Extracts Using Activated Carbon, How and Morr, *Journal of Food Science*, vol. 47, pp. 933–940, 1982.
Dietary Estrogens–A Probable Cause of Infertility and Liver Disease in Captive Cheetahs, Setchell et al., *Gastroenterology* 93:225–233, 1987.
Abnormalities in Hair Trace Elements as Indicators of Aberrant Behavior, Gottschalk et al., *Comprehensive Psychiatry* vol. 32, No. 3 (May/Jun.), 1991: pp. 229–237.
*Scientific American*, pp. 103–105, Mar., 1995.
Manganese in Infant Formulas and Learning Disability, Collipp, et al., *Ann. Nutr. Metab.*, 1983, 27:488–494, 1983.
Isoflavone Aglucones and Volatile Organic Compounds in Soybeans; Effects of Soaking Treatments, Ha, et al.,*Journal of Food Science*, vol. 57, No. 2, 1992, pp. 414–417 and 436.
Conjugation of the Plant Estrogens Formononetin and Daidzein and Their Metabolite Equol by Gastrointestinal Epithelium from Cattle and Sheep, Lundh, *J. Agric. Food Chem.*, 38, 1012–1016, 1990.
Phytoestrogen Content of Processed Soybean Products, Murphy, *Food Technology*, pp. 60–64, Jan. 1982.
Potential Health–Promoting Properties of Citrus Flavonoids, Middleton and Kandaswami, *Food Technology*, pp. 115–119, Nov. 1994.

*Primary Examiner*—Laura L. Stockton
*Attorney, Agent, or Firm*—J. Michael Dixon

[57] ABSTRACT

The present invention relates generally to a method of isolating phytoestrogens isoflavones from plant material. More specifically, this invention is directed to a method of using ion exchange technology to isolate phytoestrogens from plant protein isolates and to the phytoestrogen so isolated.

17 Claims, No Drawings

PROCESS FOR ISOLATING PHYTOESTROGENS FROM PLANT PROTEIN

RELATED CASE

This application is related to co-pending patent application Ser. No. 09/163,493, filed on Jun. 30, 1998 and is a divisional of U.S. patent application Ser. No. 713,904, filed Sep. 13, 1996, and is now U.S. Pat. No. 5,804,234.

FIELD OF THE INVENTION

The present invention relates generally to a method of isolating phytoestrogens. More specifically, this invention is directed to a method of using ion exchange technology to extract phytoestrogens from plant materials. This invention is also directed to the phytoestrogen product resulting from the inventive process and to pharmaceutical products that use the isolated plant phytoestrogens.

BACKGROUND OF THE INVENTION

Phytoestrogens occur in a variety of plants, including vegetable protein materials such as soybeans. Phytoestrogens are defined as plant substances that are structurally and functionally similar to the gonadal steroid 17 β-estradiol or that produce estrogenic effects. There are three main groups of nonsteroidial dietary estrogens which are 1) the isoflavones, 2) the coumestans and 3) the mycoestrogens (fungal). The structural similarity between these substances and the endogenous mammalian estrogens have been studied. A review of phytoestrogens and their effects in mammals is reported by Kaldas and Hughes in an article entitled, "Reproductive and General Metabolic Effects of Phytoestrogens in Mammals", *Reproductive Toxicology*, Vol. 3, pp. 81–89, 1989. The teachings of this article are herein incorporated by reference. As used in this specification and the appended claims, the term "isoflavones" is equivalent to the term "phytoestrogens" as that term is defined in the Kaldas et al. article. Representative of the isoflavones that are reduced in plant proteins in accordance with the present invention are daidzein, daidzin, genistein and genistin.

Isoflavones are produced by numerous leguminosoe and grasses, including many plants commonly consumed by man and livestock. Soy isoflavones include compounds such as daidzin, genistin, daidzein and genistein. A general structural formula for these compounds is:

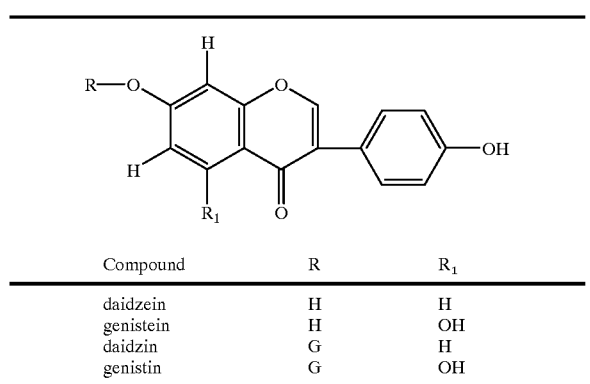

| Compound | R | $R_1$ |
|---|---|---|
| daidzein | H | H |
| genistein | H | OH |
| daidzin | G | H |
| genistin | G | OH | wherein G = glucosyl

It has recently been recognized that isoflavones contained in vegetable proteins may have a detrimental impact upon the mammals that consume the vegetable protein. See Kaldas et al., supra. The concentration of isoflavones in plant protein isolates or concentrates such as soy protein isolates, can be as high as 3,000 μg/g of protein. Isoflavones also provide the bitter or "beany" taste to vegetable proteins (see Ewan et al., infra), may reduce the bioavailability of essential minerals and may influence the nutritional value of proteins (see Kaldas et al., supra).

In contrast to the above recited negative aspects of isoflavones, it has been suggested that isoflavones may inhibit the growth of human cancer cells. Estrogens have two opposing effects on cancer, depending on dosage. Large doses inhibit breast cancer tumor development, while small doses seem to promote tumor growth. This duality extends to phytoestrogens or isoflavones. Isoflavones may stimulate or inhibit tumor growth. Setchell K D R, and Welch, M B *J. Chrom.* 386 (1987) 315–323; "Naturally Occurring Non-Steroidial Estrogens of Dietary Origin." In McLachlan J. A., ed. "Estrogens in the Environment", New York: Elsevier Press; 1985: 69–85 and Setchell, et al., "Nonsteroidial Estrogens of Dietary Origin: Possible Roles in Hormone-Dependent Disease", *Am J. Clin. Nutr.* 1984; 40: 569–578. One mechanism by which isoflavones may manifest their anti-tumor effect is blockage of estrogen receptors and uncoupling of receptor mediated response. Thus, the ability of endogenous estrogens to support tumor growth would be reduced. There is also indirect, demographic support for an isoflavone mediated reduction in cancers of hormone responsive tissues from the observation that women in countries consuming vegetarian diets have a lower incidence of breast cancer compared to meat-eating countries. Adler-creutrz et al., "Determination of Urinary Lignans and Phytoestrogen Metabolites, Potential Antiestrogens and Anticarcinogens, in Urine of Women on Various Habitual Diets" *Steroid Biochem.* 1986; 25: 791–797. Isoflavones may also have antiviral and fungicidal properties. Isoflavones have also been implicated in the reduction of serum cholesterol levels in humans, positive immunological effects and activity as an antioxidant. A final beneficial isoflavone effect is alleviation of vasomotor symptoms in menopausal women. Historically, the Chinese have used herbal medicine to treat "hot flashes". Thus, a process that facilely isolates and concentrates the isoflavones from plant material would be of value to the scientific community and the pharmaceutical industry.

Ion-exchange technology has been known for a great number of years. Ion-exchange resins are typically synthetic, insoluble, cross-linked polymers carrying acidic or basic side groups. They have high exchange capacities and can be used for an almost unlimited number of reactions. Ion-exchange resins are used in water-treatment, extraction, separation, analysis and catalysis.

Ion-exchange resins have an extended, open molecular framework that includes electrically charged ionic groups. A cation exchanger exchanges positive ions and therefore has negative ions built into its framework. An anion exchanger has positive ions in its framework. The ions of the lattice are called the fixed ions; the smaller ions of opposite charge that can change places with ions in the solution are called counterions.

Common problems encountered with ion exchange processes conducted on proteins include poor protein recovery (i.e., protein adhered to the resin) and inability of the protein slurry to pass through the resin bed resulting in a high pressure drop across the resin bed. The process which is disclosed herein fulfills the need in the pharmaceutical industry for a source of isoflavones that is economical and can be used on a commercial scale.

U.S. Pat. No. 5,352,384 to Shen discloses a process to produce an isoflavone enriched vegetable protein fiber. This patent discloses the use of a glucosidase to convert the glucone isoflavones (i.e., daidzen) in a protein slurry to the aglucone isoflavones. The fiber fraction is then recovered from the slurry by centrifugation to provide an aglucone enriched fiber.

In an article published in the *Journal of Food Science*, Vol. 47 (1982), pp. 933–940, by J. How and C. Morr entitled "Removal of Phenolic Compounds from Soy Protein Extracts Using Activated Carbon", they report subjecting soy protein extracts to activated carbon and ion exchange process treatments to remove phenolic compounds that have been reported as being responsible for adverse color and flavor characteristics of soy protein products. Protein extracts were subjected to a two stage, sequential ion exchange treatment prior to protein precipitation. The protein extract was pumped "down-flow" through a cation exchange column in the Na+ form and then an anion exchanger in the $OH^-/Cl^-$ form to remove polyvalent anions including phenolic acids, phytate and others.

U.S. Pat. No. 5,248,804 to Nardelli et al. discloses a process for the removal of phytate from plant protein using ion-exchange resins. The process uses a macroporous anion exchange resin (weak base or strong base) which has been conditioned by 1) conversion to the hydroxide form; 2) conversion to the chloride or sulfate form; and 3) thereafter conversion of the strong base sites to the carbonate form and the weak base sites to the free base form. The plant protein containing phytate is then contacted with the treated resin to remove the phytate. The teachings of U.S. Pat. No. 5,248,804 are herein incorporated by reference.

Phytate comprises the salts of phytic acid. Phytic acid is also known as inositol hexaphosphate. Thus, in using an anion exchange resin, the highly anionic phosphate groups provide the handle by which the resin can extract the phytate from the protein slurry. In contrast, isoflavones are neutral molecules and would not be expected to attach to the resin or exchange with the anions on the resin. The teachings of U.S. Pat. No. 5,248,804 are herein incorporated by reference.

U.S. Pat. No. 5,492,899 to Masor et al. discloses an infant formula with ribo-nucleotides. This patent teaches the use of certain levels and ratios of nucleotide equivalents in infant formulas and discloses an analytical technique to identify and quantify the nucleotide equivalents in a nutritional matrix. The teachings of U.S. Pat. No. 5,392,899 are herein incorporated by reference.

The present invention comprises a method to isolate isoflavones from plant material. The present invention further comprises pharmaceutical products made with the isoflavones produced in accordance with the invention. This, and other aspects of the invention are specifically described in detail in the description set forth below.

SUMMARY OF THE INVENTION

In one embodiment, the present invention relates to a method for the isolation of isoflavones from plant materials comprising:
 a) providing at least one anion exchange resin;
 b) providing a slurry of plant protein that contains isoflavones;
 c) contacting said slurry with said anion exchange resin;
 d) separating said slurry from said anion exchange resin;
 e) contacting said anion exchange resin with at least one isoflavone release agent; and
 f) separating the isoflavone release agent containing isoflavones from said anion exchange resin.

In the separation of isoflavones from plant material using the process according to the present invention, the anion that is released from the resin as a result of entrapping the isoflavone is important to the quality of the by-product waste stream, which is typically a plant protein isolate slurry. For the economical operation of the inventive process, the plant protein after extraction of the isoflavones should still be of value, i.e., useful as an animal feed. Thus, the process should not denature the protein or place into the protein slurry unacceptable anions such as hydroxyl or chloride that would make the protein unacceptable as an animal feed or for use in a human nutritional product. A typical starting material for the process of this invention would be a soy protein isolate. These soy isolates typically contain sufficient levels of isoflavones, that upon treatment with an anion exchange resin that has chloride as the counterion, would produce a by-product that has excessive levels of chloride. In similar fashion, if the counterion is hydroxyl the resulting by-product would need to be treated with acid to neutralize the basic protein by-product, thus unacceptably increasing the mineral load associated with the protein.

One aspect of this invention resides in the use of an anion exchange resin that uses a counterion, such as carbonate or bicarbonate, which avoids the aforementioned problems. As used in the specification and in the appended claims, the term "carbonate" means carbonate and bicarbonate.

There is further disclosed a method of isolating isoflavone from plant protein comprising the steps of:
 a) providing at least one anion exchange resin;
 b) conditioning said resin by:
  i) exposing the resin to an agent that converts the resin to a hydroxide form;
  ii) thereafter exposing the resin to an agent which converts the resin to a chloride or sulfate form; and
  iii) thereafter exposing the resin to an agent which converts at least some of the resin to the carbonate form;
 c) providing a slurry of plant protein containing isoflavones;
 d) contacting said slurry with said anion exchange resin;
 e) separating said slurry from said anion exchange resin;
 f) exposing the resin to an isoflavone release agent; and
 g) separating the isoflavone release agent containing isoflavones from the resin.

There is further disclosed a method of isolating isoflavones from materials containing isoflavones comprising the steps of:
 a) providing an anion exchange resin which is in a form selected from the group of hydroxide, chloride, sulfate, carbonate, bicarbonate and mixtures thereof;
 b) providing an aqueous slurry of an isoflavone containing material;
 c) contacting said slurry with said resin;
 d) separating said slurry from said resin;
 e) contacting said resin with an isoflavone release agent; and
 f) separating the isoflavone release agent containing isoflavones from the resin.

DETAILED DESCRIPTION

Typically, the method of this invention is conducted by placing the anion exchange resin in a bed, column or reactor through which a protein slurry is passed. The bed, column or reactor has at least one inlet and at least one outlet and is preferably operated as a vertical column in the "upflow" mode. In another embodiment, the preconditioned resin may be added to a tank containing an isoflavone containing slurry and after an appropriate period of time for the reaction to take place, the resin with entrapped isoflavone is filtered from the slurry.

The anion exchange resin is typically a macroporous resin and is preferably a Type I or II macroporous resin. In a preferred embodiment, the anion exchange resin is selected from weak base anion exchange resins, strong base anion exchange resins and mixtures thereof. Representative of the anion exchange resins useful in the present invention include Amberlite® RA95, IRA-910 and IRA-900 sold by Rohm and Haas Company, Dowex-22 and MSA-1 sold by Dow Chemical and Purolite A510 and A500 sold by Purolite Company. As used herein and in the claims, the term resin is meant to include gels, which those skilled in the art would understand to be useful in the process described herein. Representative of such gels are Amberlite® IRA 410 (Type II gel, strong base anion) sold by Rohm and Haas Company and IRA 402 which is a Type I strong base anion exchange gel that is not macroporous.

The materials that may be used to supply the source of isoflavones include any material that contains detectable levels of isoflavones. More specifically, plant proteins are the starting materials and the protein is obtainable from soybeans, corn, wheat, peas, beans, cottonseed, peanuts, carrots, alfalfa, algae, potatoes, apples, barley, bluegrass, clovers, coffee, garlic, hops, marijuana, oats, orchard grass, parsley, rice, rye, sage, sesame, yeast, fungus, hydrolyzates thereof and mixtures thereof. It is preferred that the protein be a protein isolate or concentrate wherein the levels of fats, oils and carbohydrates have been reduced. It has been determined that the presence of fats and oils reduces the efficiency of the inventive process.

The chemical agents useful in converting the resin to the hydroxide form include sodium hydroxide and potassium hydroxide. The most preferred agent is sodium hydroxide.

Representative of the isoflavone release agents that are useful in the present invention includes alcohols such as ethanol, methanol, propanol, pentanol and the like, organic solvents such as heptane, decane, cyclohexane, benzene, toluene and the like; water-based alkaline solutions such as NaOH, KOH, ammonium hydroxide, water-based acid solutions such as HCl and the like. In general, the isoflavone release agent must separate the isoflavone from the resin and solubilize the isoflavone. Those skilled in this art can readily determine appropriate isoflavone release agents without undue experimentation.

The chemical agents useful in converting the resin to the chloride or sulfate form include hydrochloric acid, sulfuric acid, sodium chloride. The preferred agent is hydrochloric acid.

Those skilled in the art of ion exchange technology will appreciate that the protein slurry containing the isoflavones, manganese or nucleotides, as it is contacted with the anion exchange resin, should be at a pH that does not denature the protein, which causes clogging of the column. Further, adjustment of the pH past neutral, will add significant levels of anions to the slurry which will compete for counterion sites. Typically, a pH of from about 5.5 to 10 is satisfactory. Preferably, the pH of the protein slurry feed can range from 6.0 to 8.0. The pH of the protein slurry effluent (leaving the column or bed) should be near the pH at which the protein will be used in a final product. Thus, if a plant protein treated in accordance with this invention is to be used in an infant formula, the effluent pH should be about 6.0 to 7.5. In a preferred embodiment, the plant protein feed to the resin should be as free of added anions (i.e., –OH, Cl–, and the like) as possible. The addition of acids, bases, salts and the like to the protein slurry feed decreases the efficiency of the column to remove the isoflavones, manganese or nucleotides from the protein slurry. The chemical agents useful in converting the resin to the carbonate or free base form include any of the weak base salts such as sodium carbonate, sodium bicarbonate and ammonium hydroxide. Sodium bicarbonate is the most preferred agent.

As those skilled in the art will appreciate, exchange resins have a finite capacity and may be regenerated to an active state after exhaustion or near exhaustion. Thus, as contemplated in this invention, the exchange resins after contact with the plant protein and release of the isoflavones from the resin, the resin is regenerated or reconditioned through the steps known in the art, or more preferably through the steps comprising:

1) sripping the resin of any residue (i.e., protein) and conversion to the hydroxide form, for example through the use of sodium hydroxide;
2) conversion of the resin to the chloride or sulfate form; and
3) conversion of the strong base sites on the resin to the carbonate form and conversion of the weak base sites to the free base form.

One preferred embodiment of the method according to the present invention includes the step of homogenizing the protein slurry prior to contact with the resin. Homogenizing or treatments similar thereto have been found to increase the effective isolation of isoflavones from the slurry. In addition, homogenization of the slurry prior to contact with the resin reduces the pressure drop across the resin bed or column which facilitates the facile and economic production of an isoflavone isolate.

The present invention is also directed to the isoflavones that have been isolated via the process disclosed herein and to pharmaceutical products that are made from said product.

The following Examples describe specific, but non-limiting, embodiments of the present invention. The features of the present invention which are believed to be novel are set forth with particularity in the appended claims and should be understood as to structure and manner of operation by the following detailed Examples.

EXAMPLE 1

The process according to the present invention was used to isolate isoflavones and to produce a total of 221 kg (487 lbs.) of low isoflavone, low manganese and low nucleotide content soy isolate powder that was used in the manufacture of an infant formula. In this embodiment, the starting material was treated in a manner that allowed for its use after the isoflavones had been extracted. A total of six (6) manufacturing runs were conducted.

The soy protein starting material used in this Example was obtained from Archer Daniels Midland, Inc. (ADM) of Decatur, Ill. in curd form. The curd or protein slurry was of the commercially available soy protein isolate product known as Ardex F®. In a typical commercial process, soy proteins are extracted at slightly alkaline pH from defatted soy flake or defatted soy flour. The protein fraction is then precipitated from the extract by adjusting the pH to the isoelectric point of the proteins (pH 3.8 to 6.0). As the proteins are insoluble at this pH, a curd forms and the protein curd can be separated from the soluble sugars, salts, etc., by centrifugation. To complete the purification, the protein curd is washed with water at least once at this isoelectric pH, then the protein is spray-dried either as is or after resuspension at a neutral pH. In the following experiments, ADM supplied the isoelectric curd at 10 to 14% total solids and at a pH of about 4.5.

The supplied soy curd was diluted to about 6.5% total solids with water and placed into steam jacketed kettles. Each batch of the protein-in-water slurries weighed about 908 kg (2000 lbs.). The slurry was then heated to about 49° C. (120° F.) and neutralized to a pH of 6.8 with NaOH. The slurry was then filtered through a 60 mesh strainer, UHTST (ultra high temperature short time) processed and homogenized. The UHTST steam injection was at 152° C. (305° F.) and held for 10 seconds. It was determined that UHTST treatment post anion exchange exposure produced protein with undesirable organoleptic properties. The slurry was then cooled to 55° C. (130° F.) and homogenized at 6895 kPa (1000 psig). The slurry was then transferred to the ion exchange system.

One aspect of the present invention resides in the discovery that ultra high temperature short time (UHTST) treatments need to be conducted prior to contact of the slurry with the resin to prevent spoilage of the slurry during the extended processing times. The process is conducted at temperatures where rapid microbiological growth can occur. Representative of the UHTST conditions useful in the present invention are temperatures from 120° C. (250° F.) to 155° C. (310° F.) and times of 1 to 60 seconds. The lower temperatures are associated with the longer hold times. This UHTST treatment, prior to the slurry contacting with the resin, provides microbiological stability while minimizing nutrient degradation.

The ion exchange system comprised a stainless steel, rubber lined column having inlet and outlet ports and a height of 401 cm (13'2") and a diameter of 30.5 cm (12 inch). 70 liters Amberlite® IRA-910 anion exchange resin from the Rohm and Haas Co. of Philadelphia, Pa. was placed in the column. IRA-910 is a macroreticular strongly basic anion exchange resin. The basicity of this resin is derived from quaternary ammonium functionality with slightly lower basic strength than a Type 1 anion exchange resin. This resin is supplied in the chloride form and is approved by the United States Food and Drug Administration (FDA) (after condition cycling) for use in processing edible products.

Prior to contact with the protein curd, the resin was preconditioned. The resin was preconditioned through contact in an upflow mode with 6% by weight NaOH at a flow rate of 4.6 to 5.7 liters (1.2 to 1.5 gal) per minute for 30 minutes. The resin bed was then washed with deionized water for 10 to 15 minutes in the upflow mode. The resin was then contacted with 1.0% by weight HCl in a downflow mode at 16 liters per minute. The resin was then washed with deionized water in the downflow mode for about 30 minutes. 2.8 kgs (6.18 lbs) of sodium bicarbonate was added to about 196 liter (49 gals) of water and agitated to dissolve. This solution was then pumped to the column in a downflow mode at about 4 liters per minute. The bed was again rinsed with deionized water until the conductivity of the effluent was 300 µmhos or less. The resin bed was then backwashed to remove air and reclassify the resin. The resin bed was allowed to settle naturally and the water was drained from the column. The column was ready for the service cycle after draining the water to the top of the resin bed.

The protein slurry was pumped upflow through the ion exchange column at a flow rate of 3.6 to 3.8 kgs (8 to 8.4 lbs.) per minute. The inlet temperature of the slurry was 55–60° C. (130–140° F.) and the contact time was about 20 minutes minimum. Protein slurry exiting the column was cooled, samples were taken and then spray dried using conventional techniques and equipment.

The column before the next batch was regenerated with 6% NaOH, 1% HCl and 1.5% NaHCO$_3$ (sodium bicarbonate) as described above for the initial preparation of the resin bed. All solutions were prepared with deionized water.

Results

A total of six batches were manufactured to yield a total of about 208 kgs of ion exchanged soy isolate powder. Three (3) samples were taken at various times during the processing of each batch: 1) protein slurry fed to the ion exchange column; 2) effluent from the column; and 3) dried powder. The samples were analyzed for isoflavones as described below. In order to make comparisons between the liquids and the powder possible, the concentration of the powder was normalized to 6½% total solids.

Mean levels and standard deviations before and after ion exchange were calculated for the six runs.

An important benefit of the instant inventive process is that high levels of protein are recovered from the treated plant protein isolates. This means that very little protein is lost in the resin column or bed. In these experiments, over 90% of the protein that entered the resin column was recovered in the effluent.

It is important to note that the overall efficiency of the process of this invention is improved when solubility and homogenity of the protein slurry is enhanced. Thus, the pre-filtration (through a 60 mesh filter) and homogenization greatly reduced the pressure drop across the column, which increased the efficiency of the inventive process. In comparison, the process without the pre-filtering and homogenization resulted in an initial pressure drop of about 138 kPa (20 psig) while the pre-filtering and homogenization resulted in an initial pressure drop of about 14 to 35 kPa (2–5 psig). After about 4 to 6 hours of operation without prefiltering and homogenization, the pressure drops of 276 to 414 kPa (40–60 psig) were experienced while with prefiltering and homogenization, pressure drops were about 55 to 83 kPa (8–12 psig).

The isoflavones were almost completely removed by the present inventive process. Table I sets forth the isoflavones that were analyzed for the level of the feed slurry, level in the effluent and level in the powder. These four isoflavones are representative of the family of phytoestrogens or isoflavones and serve as good indicators of the efficiency of the inventive process.

TABLE I

| ISOFLAVONE | FEED µg/g* | EFFLUENT µg/g* | POWDER µg/g* | REDUCTION % | |
|---|---|---|---|---|---|
| | | | | FEED VS. POWDER | FEED VS. EFFLUENT |
| Daidzin | 4.12 ± 0.87 | 0.51 ± 0.21 | 0.68 ± 0.37 | 83.5 ± 6.8 | 87.6 |
| Genistin | 10.0 ± 2.8 | 0.82 ± 0.55 | 0.87 ± 0.72 | 91.4 ± 5.9 | 91.8 |
| Daidzein | 3.9 ± 6.5 | 0.10 ± 0.0 | 0.10 ± 0.0 | 97.4 ± 4.3 | 97.4 |
| Genistein | 3.7 ± 1.4 | 0.10 ± 0.0 | 0.10 ± 0.0 | 97.3 ± 1.4 | 97.3 |

*normalized at a 6.5 wt % solution

EXAMPLE II

Isolation of Isoflavones

Alcohol Wash

In this experiment, isoflavones were isolated from soy curd using the previously described ion exchange resin and then rinsing or releasing the isoflavones from the resin with an alcohol/water solution. In a laboratory column, (80 liters) Amberlite® IRA-910 was pre-conditioned as described in Example I and the soy curd as described in Example I was passed over the column until phosphorus levels in the effluent approached breakthrough (i.e., levels of the feed). The column was rinsed with warm water (49° C.) to remove entrapped protein and then with cool (19° C.) water. A 50% by weight solution of ethanol and water was then pumped through the column at about 4 liters per minute in the downflow mode. The alcohol/water solution was recycled through the column for about 1 hour (3 bed volumes). During recycle, the alcohol content was diluted to about 5% through mixture with water in the column. About 100 liters of the isoflavone rich solution was recovered. The analytical procedure for isoflavone analysis is set forth in Example IV. The soy protein feed contained 2.7% by weight daidzin and 0.6% genistin. The solution from the column contained 850 $\mu g/L$ daidzin and 380 $\mu g/L$ genistin. Extraction can be improved by soaking the resin in the isoflavone release agent (i.e., alcohol solution) and by increasing the percentage of alcohol up to about 80% by weight. Increases in isoflavone yield would also be seen when the soflavone release agent is warmed up to about 49° C.

EXAMPLE III

Isolation of Isoflavones

Regeneration

In this experiment, the content of the regeneration effluent was analyzed. The procedure of Example I was followed except that during the regeneration of the resin at the NaOH treatment, a 240 gm (8 oz) sample was withdrawn. Analysis of this sample for isoflavones is set forth in Table II.

TABLE II

Isoflavones from Regeneration

| Daidzin | |
|---|---|
| $\mu g/g$ | 2.6 |
| nanomoles/g | 6.2 |
| Genistin | |
| $\mu g/g$ | 1.2 |
| nanomoles/g | 2.8 |
| Daidzein | |
| $\mu g/g$ | <0.1 |
| nanomoles/g | <0.2 |
| Genistein | |
| $\mu g/g$ | <0.1 |
| nanomoles/g | <0.2 |

As the data from Example I and II indicate, the process according to this invention provides an effective and economical means for the isolation and concentration of isoflavones.

EXAMPLE IV

Nutritional Product Using Low Isoflavone Soy Protein

The soy protein produced in Example I was used to produce an infant formula A control product and the infant formula according to this invention were then analyzed for isoflavone content. The procedure used to produce the experimental and control products was that described in U.S. Pat. No. 5,021,245 to Borschel et al. except that the fiber was omitted.

An HPLC (high pressure liquid chromatography) method, as described below, was used to quantitate the major soy isoflavones (genistin, daidzin, genistein and daidzein) using a method adapted from the following three (3) articles which are herein incorporated by reference.

1) Setchell, K D R, and Welch, M B *J. Chrom*. 386 (1987) 315–323
2) Wang, G., Kuan, S S, Francis, O J, Ware, G M, and Corman, A S *J. Agric. Food Chem*. 38 (1990) 185–190
3) Barnes, S., Kirk M., and Coward, L. *J. Agric. Food. Chem*. 42 (1994) 2466–2474

Samples of the ready-to-feed experimental and control infant formula were obtained and 20 ml of each was weighed into a tared 250 ml round bottom flask. 80 ml of ethyl alcohol was then added and the mixture was stirred. A condenser was attached to the flask and the samples were refluxed at 80° C. for 2 hours. The mixtures were then cooled to room temperature and quantitatively transferred to a 100 ml volumetric flask. The precipitate and the flask were rinsed with 15 ml of 80% alcohol (v/v). The volumetric flasks were brought to volume with 80% alcohol and the samples were then well mixed. The samples were filtered through Whatman No. 41 paper and then 15 ml of each filtrate was placed into a graduated conical 15 ml stoppered glass test tube. Each tube was placed in a warm water bath and a stream of nitrogen was used to evaporate each sample to 3 ml. The tubes were then cooled to room temperature and 1 ml of methanol was added to each tube and then diluted to 10 ml with water and mixed well. 1.5 ml of each sample was then filtered through a 0.45 $\mu m$ polypropylene membrane into an HPLC autosampler vial. Test analysis for isoflavones using reverse phase HPLC was conducted with the HPLC system as follows:

| | |
|---|---|
| Column | Vydac C18 Pharmaceutical; 250 × 4.6 mm; 5 $\mu m$ |
| Detection | UV absorbance at 254/280 nm |
| Injection | 50 mcL |
| Temperature | ambient |
| Flow Rate | 0.8 ml/min |
| Run Time | 120 minutes |
| Eluant A | 950 volumes water; 50 volumes CH$_3$CN; 1 volume trifloroacetic acid (TFA) |
| Eluant B | 400 volumes water; 600 volumes CH$_3$CN; 1 volume TFA |

Gradient Program:

| Time (minutes) | 0 | 5 | 95 | 100 | 102 | 120 |
|---|---|---|---|---|---|---|
| % Eluant B | 0 | 0 | 60 | 100 | 100 | 0 |

The results of the test are set forth in Table III.

TABLE III

| Soy Isoflavones | Control $\mu g/g$ | Experimental $\mu g/g$* |
|---|---|---|
| Daidzin | 11.6 | <1.0 |
| Daidzein | 1.0 | <1.0 |
| Genistin | 19.4 | <1.0 |
| Genistein | 2.2 | <1.0 |
| TOTAL | 34.2 | N/A |

*At detection limits.

Industrial Applicability

The process disclosed in this invention is a very effective, inexpensive and reliable method for the commercial isolation of isoflavones from isoflavone containing materials such as plant protein isolates. The isoflavones recovered from the regeneration/alcohol release process after contact with the resin are valuable as potential anticancer compounds.

Commercial scale use of the process of this invention is enhanced when the protein slurry is pre-filtered and homogenized prior to contact with the resin bed. Macroporous resins in the bicarbonate form are preferred and ethyl alcohol is the preferred release agent.

The scientific community and the pharmaceutical industry will benefit from the present invention through the facile and economic isolation and concentration of isoflavones.

While certain representative embodiments and details have been presented for the purpose of illustrating the invention, it will be apparent to those skilled in the art that various changes and modifications may be made therein without departing from the spirit or scope of the invention.

We claim:

1. A method for the isolation of isoflavones from plant materials comprising:
   a) providing at least one anion exchange resin;
   b) providing a slurry of plant protein that contains isoflavones;
   c) passing the slurry through a structure which contains the anion exchange resin, and the structure has at least one inlet and at least one outlet;
   d) the slurry enters the structure via the inlet and the slurry exits the structure via the outlet, and the inlet is located lower in the structure than the outlet;
   e) contacting said anion exchange resin with an isoflavone release agent, in which said isoflavone release agent is an alcohol, an organic solvent, an admixture of alcohol and water, or an admixture of an organic solvent and water and;
   f) separating the isoflavone release agent containing isoflavones from said anion exchange resin.

2. The method according to claim 1 which additionally comprises the step of subjecting said slurry to a homogenization step prior to contacting the slurry with said anion exchange resin.

3. The method according to claim 1 which additionally comprises the step of subjecting said slurry to an ultra high temperature treatment prior to step e).

4. The method according to claim 1 wherein said resin is a macroporous resin.

5. A method of isolating isoflavone from plant proteins comprising the steps of:
   a) providing at least one anion exchange resin;
   b) conditioning said resin by:
      i) exposing the resin to an agent that converts the resin to a hydroxide form;
      ii) thereafter exposing the resin to an agent which converts the resin to a chloride form or a sulfate form; and
      iii) thereafter exposing the resin to an agent which converts at least some of the resin to the carbonate form,
   c) providing a slurry of plant protein containing isoflavones;
   d) passing the slurry through a structure which contains the resin, and the structure has at least one inlet and at least one outlet;
   e) the slurry enters the structure via the inlet and the slurry exits the structure via the outlet, and the inlet is located lower in the structure than the outlet;
   f) exposing the resin to an isoflavone release agent, in which said isoflavone release agent is an alcohol, an organic solvent, an admixture of alcohol and water, or an admixture of an organic solvent and water; and;
   g) separating the isoflavone release agent containing isoflavones from the resin.

6. The method according to claim 5 wherein the agent employed in step b) i) is selected from sodium hydroxide and potassium hydroxide and wherein the agent employed in step b) ii) is selected from hydrochloric acid, sulfuric acid and sodium chloride; and wherein the agent employed in step b) iii) is selected from sodium carbonate, sodium bicarbonate and ammonium hydroxide.

7. The method according to claim 5 further comprising the steps of:
   h) after the completion of the g), reconditioning the anion exchange resin by:
      i) exposing the resin to an agent which strips the surface of the resin of residue and converts the resin to a hydroxide form;
      ii) thereafter exposing the resin to an agent which coverts the resin to either a chloride form or a sulfate form; and
      iii) thereafter exposing the resin to an agent which converts at least some of the resin to the carbonate form;
   i) providing more of the slurry;
   j) bringing the slurry into contact with the reconditioned resin;
   k) separating the slurry from the resin; and
   l) contacting the resin with an isoflavone release agent in which said isoflavone release agent is an alcohol, an organic solvent, an admixture of alcohol and water, or an admixture of an organic solvent and water.

8. The method for the isolation of isoflavones from a plant protein selected from the group consisting of soybean, pea and corn, said method comprising the steps of:
   a) providing an anion exchange resin which is in a form selected from the group of hydroxide, chloride, sulfate, carbonate, bicarbonate and mixtures thereof;
   b) providing an aqueous slurry of an isoflavone containing material;
   c) passing the slurry through a structure which contains the resin, and the structure has at least one inlet and at least one outlet;
   d) the slurry enters the structure via the inlet and the slurry exits the structure via the outlet, and the inlet is located lower in the structure than the outlet;
   e) contacting said resin with an isoflavone release agent, in which said isoflavone release agent is an alcohol, an organic solvent, an admixture of alcohol and water, or an admixture of an organic solvent and water; and;
   f) separating the isoflavone release agent containing isoflavones from the resin.

9. The method according to claim 8 wherein the isoflavone release agent is selected from methanol, aqueous solutions of methanol, ethanol, or aqueous solutions of ethanol.

10. The method according to claim 8 additionally comprising the homogenization and ultra high temperature heat treatment of said slurry prior to contact with said resin.

11. The method according to claim 8 wherein said resin is a macroporous resin.

12. The method according to claim 8 wherein said plant protein is hydrolyzed.

13. The method according to claim 1 in which said plant protein is obtained from soybeans, corn, wheat, peas, beans, cottonseed, peanuts, carrots, alfalfa, algae, potatoes, apples, barley, bluegrass, clovers, coffee, garlic, hops, marijuana, oats, orchard grass, parsley, rice, rye, sage, sesame, yeast, or fungus hydrolyzates.

14. The method according to claim 1 in which said isoflavone release agent contains at least one material selected from the group consisting of ethanol, methanol, propanol, pentanol, heptane, decane, cyclohexane, and, benzene.

15. The method according to claim 1 in which the isoflavone release agent enters the structure through said outlet and exits said structure through said inlet.

16. The method according to claim 1 in which the structure is a vertical column.

17. The method according to claim 5 in which the structure is a vertical column.

\* \* \* \* \*